United States Patent
Novlan et al.

(10) Patent No.: US 9,438,321 B2
(45) Date of Patent: Sep. 6, 2016

(54) METHODS AND APPARATUS FOR CODEBOOK SUBSET RESTRICTION FOR TWO-DIMENSIONAL ADVANCED ANTENNA SYSTEMS

(71) Applicant: Samsung Electronics Co., LTD, Suwon-si, Gyeonggi-do (KR)

(72) Inventors: Thomas David Novlan, Dallas, TX (US); Krishna Sayana, San Jose, CA (US); Young-Han Nam, Richardson, TX (US); Jin-Kyu Han, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 264 days.

(21) Appl. No.: 13/939,934

(22) Filed: Jul. 11, 2013

(65) Prior Publication Data
US 2014/0016549 A1    Jan. 16, 2014

Related U.S. Application Data

(60) Provisional application No. 61/670,936, filed on Jul. 12, 2012.

(51) Int. Cl.
*H04B 7/04* (2006.01)

(52) U.S. Cl.
CPC .......... *H04B 7/0417* (2013.01); *H04B 7/0469* (2013.01); *H04B 7/0478* (2013.01)

(58) Field of Classification Search
None
See application file for complete search history.

(56) References Cited

U.S. PATENT DOCUMENTS

| | | | |
|---|---|---|---|
| 2011/0170621 A1 | 7/2011 | Choi et al. | |
| 2011/0249713 A1* | 10/2011 | Hammarwall et al. | 375/220 |
| 2012/0069919 A1 | 3/2012 | Clerckx et al. | |
| 2012/0076236 A1* | 3/2012 | Ko et al. | 375/296 |
| 2012/0121034 A1 | 5/2012 | Murakami et al. | |
| 2012/0147992 A1 | 6/2012 | Yang et al. | |
| 2013/0163687 A1* | 6/2013 | Jing et al. | 375/267 |
| 2013/0308714 A1* | 11/2013 | Xu et al. | 375/267 |

OTHER PUBLICATIONS

International Search Report dated Oct. 24, 2013 in connection with International Patent Application No. PCT/KR2013/006261, 4 pages.

* cited by examiner

*Primary Examiner* — Ian N Moore
*Assistant Examiner* — Lakeram Jangbahadur

(57) ABSTRACT

A user equipment (UE) in a wireless network having two-dimensional antenna systems performs a method of codebook sampling. The method includes receiving from an eNodeB (eNB) an indication of a restricted subset M of vertical precoding matrices, wherein M is less than a total number of vertical precoding matrices N in a codebook, the codebook comprising a plurality of vertical precoding matrices and horizontal precoding matrices. The method also includes feeding back vertical precoding matrix indicators (V-PMI) to the eNB based on the restricted subset of vertical precoding matrices.

25 Claims, 6 Drawing Sheets

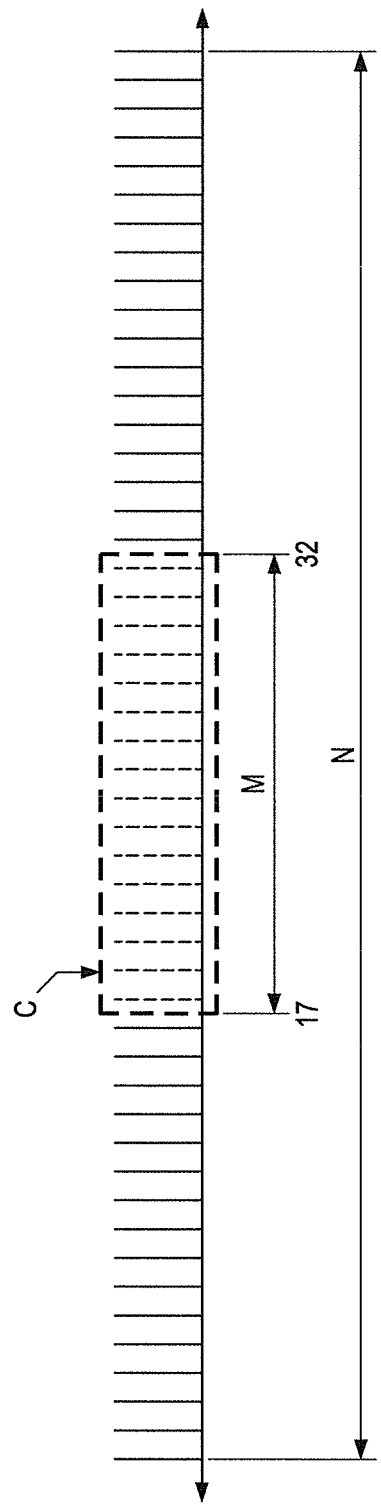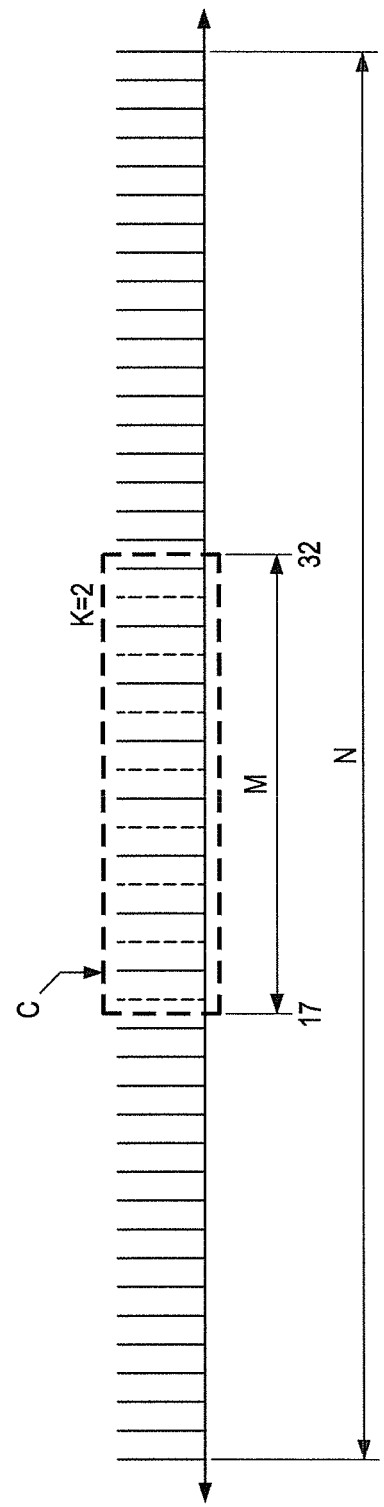

METHODS AND APPARATUS FOR CODEBOOK SUBSET RESTRICTION FOR TWO-DIMENSIONAL ADVANCED ANTENNA SYSTEMS

CROSS-REFERENCE TO RELATED APPLICATION(S) AND CLAIM OF PRIORITY

The present application claims priority to U.S. Provisional Patent Application Ser. No. 61/670,936, filed Jul. 12, 2012, entitled "CODEBOOK SUBSET RESTRICTION FOR 2-DIMENSIONAL ADVANCED ANTENNA SYSTEMS". The content of the above-identified patent documents is incorporated herein by reference.

TECHNICAL FIELD

The present application relates generally to wireless communication and, more specifically, to methods and apparatus for codebook subset restriction for two-dimensional advanced antenna systems.

BACKGROUND

Wireless communication has been one of the most successful innovations in modern history. Recently, the number of subscribers to wireless communication services exceeded 5 billion and continues to grow quickly. The demand of wireless data traffic is rapidly increasing due to growing popularity among consumers and businesses of smart phones and other mobile data devices, such as tablets, "note pad" computers, net books, and eBook readers. In order to meet the high growth in mobile data traffic, improvements in radio interface efficiency and communication technology is of paramount importance. One such improvement is the growing use of two-dimensional advanced antenna systems in multi-user (MU) multiple-input multiple-output (MIMO) communication systems.

SUMMARY

A method of codebook sampling for use in a user equipment (UE) in a wireless network having two-dimensional antenna systems is provided. The method includes receiving from an eNodeB (eNB) an indication of a restricted subset M of vertical precoding matrices, wherein M is less than a total number of vertical precoding matrices N in a codebook, the codebook comprising a plurality of vertical precoding matrices and horizontal precoding matrices. The method also includes feeding back vertical precoding matrix indicators (V-PMI) to the eNB based on the restricted subset of vertical precoding matrices.

A user equipment (UE) configured for communication with an eNodeB (eNB) in a wireless network having two-dimensional antenna systems is provided. The UE includes at least one antenna and a processor coupled to the at least one antenna. The processor is configured to receive from the eNB an indication of a restricted subset M of vertical precoding matrices, wherein M is less than a total number of vertical precoding matrices N in a codebook, the codebook comprising a plurality of vertical precoding matrices and horizontal precoding matrices. The processor is also configured to determine vertical precoding matrix indicators (V-PMI) to feed back to the eNB based on the restricted subset of vertical precoding matrices.

An eNodeB (eNB) configured for communication with a plurality of user equipments (UEs) in a wireless network having two-dimensional antenna systems is provided. The eNB includes at least one antenna and a processor coupled to the at least one antenna. The processor is configured to transmit to a UE an indication of a restricted subset M of vertical precoding matrices, wherein M is less than a total number of vertical precoding matrices N in a codebook, the codebook comprising a plurality of vertical precoding matrices and horizontal precoding matrices. The processor is also configured to receive feedback from the UE, the feedback comprising a plurality of vertical precoding matrix indicators (V-PMI) based on the restricted subset of vertical precoding matrices.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 10 and 11 illustrate examples of sliding window based subset restriction, according to embodiments of this disclosure.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into this disclosure as if fully set forth herein: (i) 3GPP Technical Specification No. 36.211, version 10.1.0, "E-UTRA, Physical channels and modulation" (hereinafter "REF1"); (ii) 3GPP Technical Specification No. 36.212, version 10.1.0, "E-UTRA, Multiplexing and Channel coding" (hereinafter "REF2"); and (iii) 3GPP Technical Specification No. 36.213, version 10.1.0, "E-UTRA, Physical Layer Procedures" (hereinafter "REF3").

Figure 1:
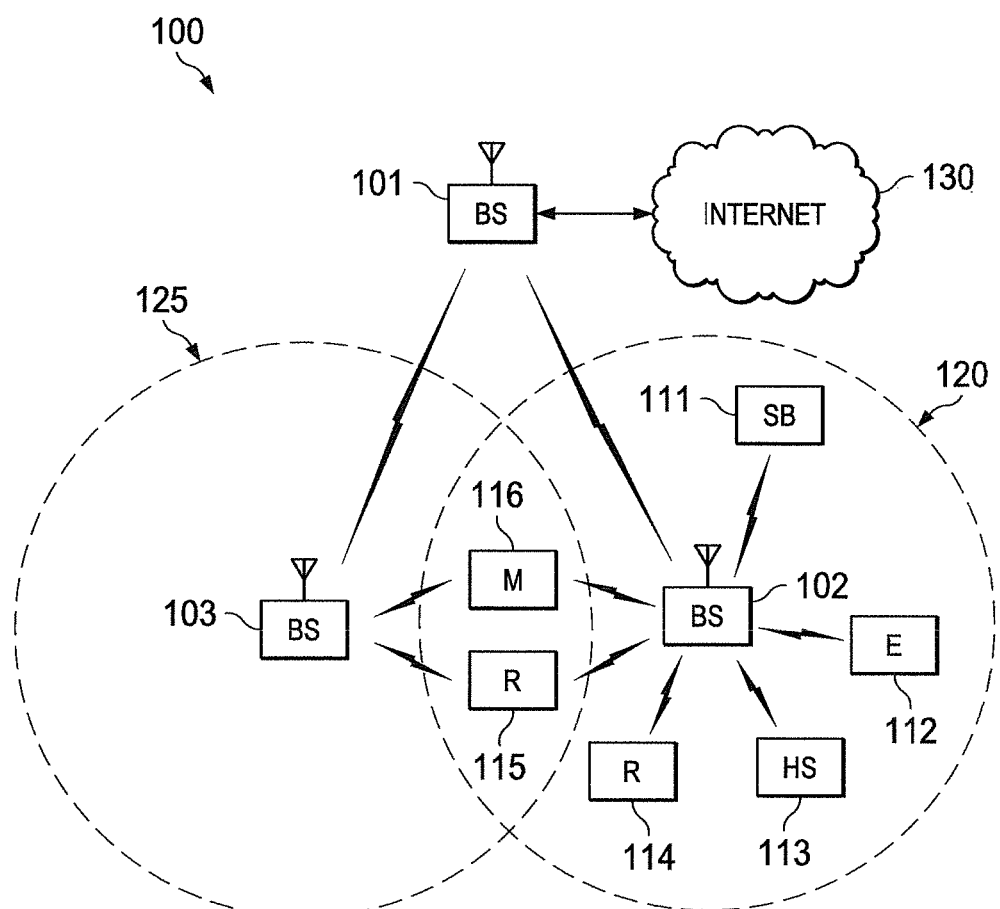
FIG. 1 illustrates a wireless network according to an embodiment of this disclosure.

FIG. 1 illustrates a wireless network 100 according to one embodiment of this disclosure. The embodiment of wireless network 100 illustrated in FIG. 1 is for illustration only. Other embodiments of wireless network 100 could be used without departing from the scope of this disclosure.

The wireless network 100 includes eNodeB (eNB) 101, eNB 102, and eNB 103. The eNB 101 communicates with eNB 102 and eNB 103. The eNB 101 also communicates with Internet protocol (IP) network 130, such as the Internet, a proprietary IP network, or other data network.

Depending on the network type, other well-known terms may be used instead of "eNodeB," such as "base station" or "access point". For the sake of convenience, the term "eNodeB" shall be used herein to refer to the network infrastructure components that provide wireless access to remote terminals.

The eNB 102 provides wireless broadband access to network 130 to a first plurality of user equipments (UEs) within coverage area 120 of eNB 102. The first plurality of UEs includes UE 111, which may be located in a small business; UE 112, which may be located in an enterprise; UE 113, which may be located in a WiFi hotspot; UE 114, which may be located in a first residence; UE 115, which may be located in a second residence; and UE 116, which may be a mobile device, such as a cell phone, a wireless laptop, a wireless PDA, or the like. UEs 111-116 may be any wireless communication device, such as, but not limited to, a mobile phone, mobile PDA and any mobile station (MS).

For the sake of convenience, the term "user equipment" or "UE" is used herein to designate any remote wireless equipment that wirelessly accesses an eNB, whether the UE is a mobile device (e.g., cell phone) or is normally considered a stationary device (e.g., desktop personal computer, vending machine, etc.). In other systems, other well-known terms may be used instead of "user equipment", such as "mobile station" (MS), "subscriber station" (SS), "remote terminal" (RT), "wireless terminal" (WT), and the like.

The eNB 103 provides wireless broadband access to a second plurality of UEs within coverage area 125 of eNB 103. The second plurality of UEs includes UE 115 and UE 116. In some embodiment, eNBs 101-103 may communicate with each other and with UEs 111-116 using LTE or LTE-A techniques. In some embodiments, one or more of base stations 101-103 may communicate with each other and with UEs 111-116 using 5G, LTE-A, or WiMAX techniques including techniques for: codebook subset restriction as described in embodiments of the present disclosure Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Although FIG. 1 depicts one example of a wireless network 100, various changes may be made to FIG. 1. For example, another type of data network, such as a wired network, may be substituted for wireless network 100. In a wired network, network terminals may replace eNBs 101-103 and UEs 111-116. Wired connections may replace the wireless connections depicted in FIG. 1.

Figure 2:
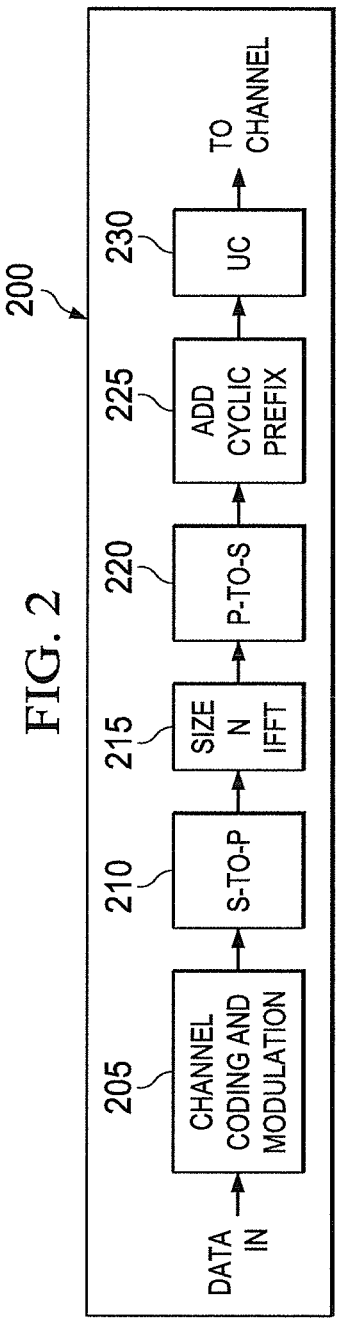
FIG. 2 illustrates a high-level diagram of a wireless transmit path according to an embodiment of this disclosure.
Figure 3:
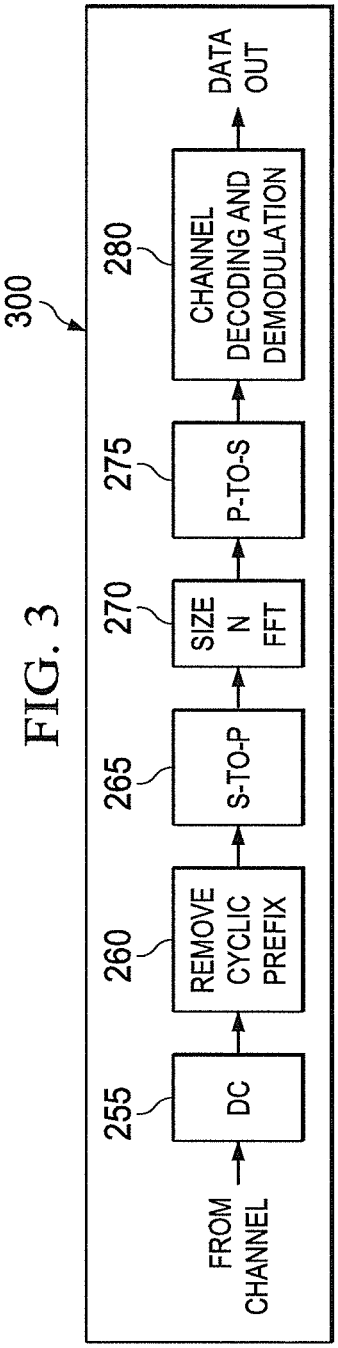
FIG. 3 illustrates a high-level diagram of a wireless receive path according to an embodiment of this disclosure.

FIG. 2 is a high-level diagram of a wireless transmit path. FIG. 3 is a high-level diagram of a wireless receive path. In FIGS. 2 and 3, the transmit path 200 may be implemented, e.g., in eNB 102 and the receive path 300 may be implemented, e.g., in a UE, such as UE 116 of FIG. 1. It will be understood, however, that the receive path 300 could be implemented in an eNB (e.g. eNB 102 of FIG. 1) and the transmit path 200 could be implemented in a UE. In certain embodiments, transmit path 200 and receive path 300 are configured to perform methods for codebook subset restriction reporting as described in embodiments of the present disclosure.

Transmit path 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. Receive path 300 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2 and 3 may be implemented in software while other components may be implemented by configurable hardware (e.g., a processor) or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in eNB 102 and UE 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at UE 116 after passing through the wireless channel and reverse operations to those at eNB 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of eNBs 101-103 may implement a transmit path that is analogous to transmitting in the downlink to UEs 111-116 and may implement a receive path that is analogous to receiving in the uplink from UEs 111-116. Similarly, each one of UEs 111-116 may implement a transmit path corresponding to the architecture for transmitting in the uplink to eNBs 101-103 and may implement a receive path corresponding to the architecture for receiving in the downlink from eNBs 101-103.

Figure 4:
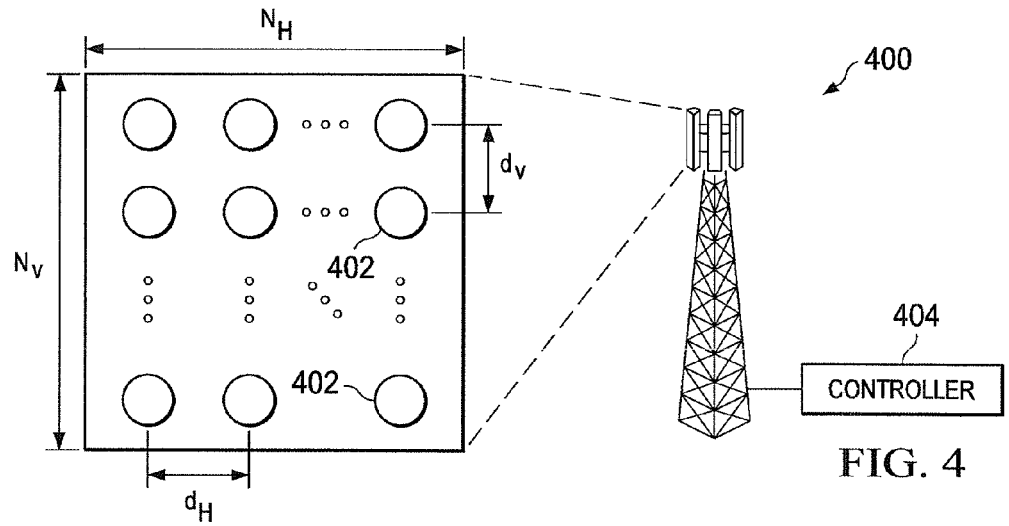
FIG. 4 illustrates a transmission point according to embodiments of this disclosure.

FIG. 4 illustrates a transmission point according to one embodiment of this disclosure. The embodiment of transmission point 400 illustrated in FIG. 4 is for illustration only. Other embodiments of transmission point 400 could be used without departing from the scope of this disclosure.

Transmission point (TP) 400 is equipped with a two-dimensional (2D) active antenna array comprising a plurality of antenna elements 402, and is configured for multi-user multiple-input multiple-output (MU-MIMO) transmissions. In some embodiments, TP 400 may also be configured for full dimension (FD) MIMO transmissions. As used herein, the term "transmission point" refers to a network node that can transmit downlink signals and receive uplink signals in a cellular network. Examples of TPs may include base stations, NodeBs, enhanced NodeBs (eNBs), remote radio heads (RRHs), and the like. As particular examples, TP 400 may represent one or more of eNBs 101-103 of FIG. 1. An entity controlling at least one TP is called the controller, network, or eNB. As shown in FIG. 4, TP 400 includes a controller 404. Each active antenna array may have a separate base band, which can dynamically control the antenna weights in a frequency selective manner.

TP 400 includes N ($N=N_H \times N_V$) 2D active antenna elements 402, and the N antenna elements 402 are placed in a 2D grid of $N_H \times N_V$. The horizontal spacing between any two adjacent antenna elements 402 is denoted by $d_H$, and the vertical spacing between any two adjacent antenna elements 402 is denoted by $d_V$.

Figure 5:
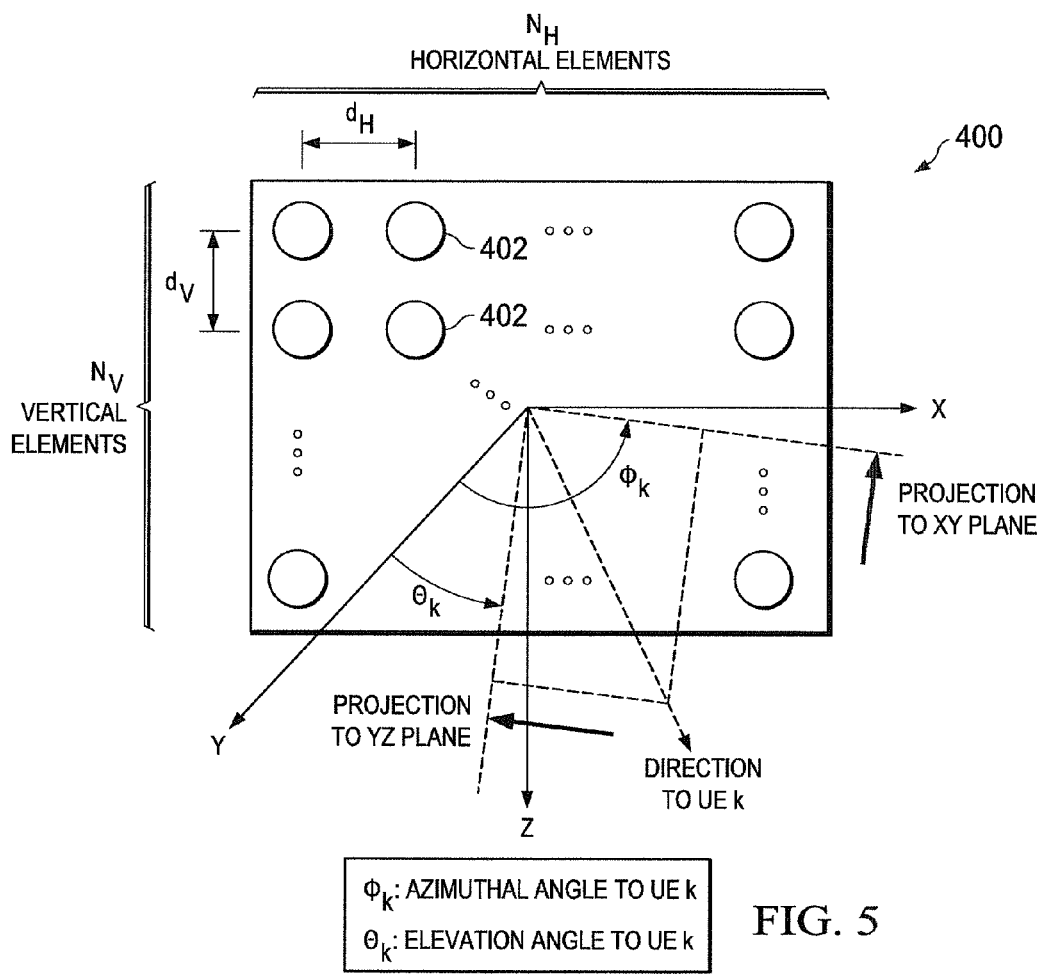
FIG. 5 illustrates azimuth and elevation angles from a transmission point to a user equipment, according to embodiments of this disclosure.

FIG. 5 illustrates azimuth and elevation angles from transmission point 400 to a user equipment, according to one embodiment of this disclosure. The embodiment of TP 400 illustrated in FIG. 5 is for illustration only. Other embodiments could be used without departing from the scope of this disclosure.

FIG. 5 illustrates the azimuth and elevation angles to a UE k from the 2D antenna array of antenna elements of TP 400. As shown in FIG. 5, the antenna elements 402 of TP 400 are arranged in a rectangle on a XZ plane in an orthogonal XYZ coordinate system. The origin of the XYZ coordinate system is placed at the center of the rectangle. The azimuth (horizontal) angle $\phi_k$ for UE k is defined as the angle between the Y axis and the projection vector of a straight line between TP 400 and UE k to the XY plane. The elevation (vertical) angle $\theta_k$ is defined as the angle between the Y axis and the projection vector of the straight line between TP 400 and UE k to the YZ plane.

In cellular networks, the network utilizes channel state information (CSI) from UEs to schedule time-frequency resources, and to select precoders and modulation and coding schemes (MCS) for each individual UE. To facilitate the estimation of CSI at the UE, the network can configure and transmit CSI reference signals (CSI-RS). At the same time, each UE can be configured to feed back estimated precoding matrix indicators (PMI), channel quality information (CQI), and rank information (RI), by receiving and processing the CSI-RS. In many cases, the CSI feedback from the UE is primarily associated with horizontal CSI associated with the azimuth angles. For example, PMI/CQI feedback for downlink beamforming in LTE informs the eNB the horizontal direction (or the azimuth angle) in which the UE receives the strongest signal, and the associated channel strength. When active antenna array elements are introduced in the vertical domain as well, the use of vertical CSI feedback emerges.

The codebook used for feedback can be designed based on a 64-antenna MIMO system. However, it is advantageous to simplify codebook design to facilitate reasonable codebook size and acceptable computational complexity at the UE receivers. Some observations can be made regarding the channel behavior corresponding to a 2D active antenna array. The overall transmit covariance matrix corresponding to all of the 64 antennas in an 8×8 array may be separated into two components using Kronecker decompositions as an approximation, $$R_{64 \times 64} = R_{8 \times 8}^V \otimes R_{8 \times 8}^H. \quad (1)$$

It can be shown that the precoder can be approximated into horizontal and vertical components, $$V_{64 \times n^2} = V_{8 \times n}^V \otimes V_{8 \times n}^H. \quad (2)$$

where n is the rank of transmission.

In LTE Release 10, the UE feeds back a CQI in addition to the PMI and RI, which corresponds to a MCS level that can be supported reliably by the UE, with a certain target error probability. The feedback designs in LTE Release 10 are optimized for single user MIMO. PMI and CQI determined by the UE assuming single user MIMO is referred to as single user PMI (SU-PMI) and single user CQI (SU-CQI), respectively.

Figure 6:
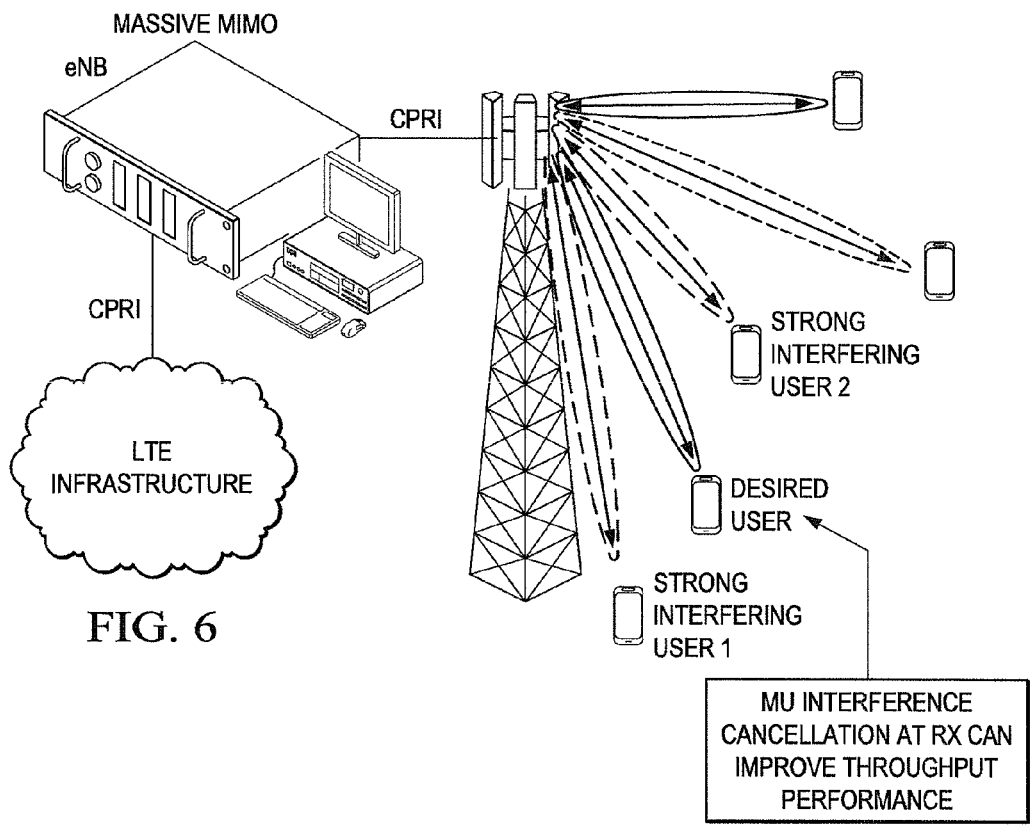
FIG. 6 illustrates an example operation of a multi-user MIMO system with a two-dimensional (2D) array, according to embodiments of this disclosure.

FIG. 6 illustrates an example operation of a multi-user MIMO system with a two-dimensional array, according to an embodiment of this disclosure. The embodiment of the multi-user MIMO system illustrated in FIG. 6 is for illustration only. Other embodiments could be used without departing from the scope of this disclosure.

Multi-user MIMO corresponds to a transmission scheme where a transmitter can transmit data to two or more UEs at the same time/frequency resource, by relying on spatial separation of the corresponding user's channels. With a smaller number of transmit antennas, the number of users that can be supported is limited. Since the number of transmit antennas supported in LTE Release 10 is limited to a maximum of eight antennas, many designs for multi-user MIMO support are optimized for a case of two-user MU-MIMO transmission with a single stream per each UE.

However, with MU-MIMO, the MCS to be used by the scheduler for each user may need to be determined at the eNB. The MCS that can be supported reliably for each UE is dependent on co-channel PMI corresponding to the co-scheduled UE. For scheduling flexibility, a transmitter may pair a user with any other UE.

Assuming a typical configuration of two receiver antennas at the UE, single user MIMO (SU-MIMO) up to rank 2 can be supported. Further, it is expected that MU-MIMO is only scheduled by an eNB when the performance is better than the SU-MIMO. This means that scheduled users have good spatial separation. Single user CQI (SU-CQI) is an approximation of MU-CQI for determination of MCS at the eNB.

However, for MIMO with a large number of transmit antennas (e.g., number of transmit antennas is greater than number of receive antennas, or $N_T > N_R$), the spatial rank of SU-MIMO transmission is limited by the number of receive antennas. Hence, MU-MIMO is frequently used in such cases. Accordingly, methods are defined to determine MU-CQI at the UE. The eNB predictions of MCS may not be accurate since the receiver implementation-specific algorithms, like interference cancellation and suppression, also need to be accurately reflected in any MU-CQI calculation.

In wireless communication standards such as LTE, efficient PMI selection is associated with reducing control information overhead and reducing complexity at the receiver. As a result, because certain PMI indices are infrequently selected or never selected, codebook subset restriction has been specified in LTE to let a UE report PMI within the codebook subset configured by the serving eNB. This can be achieved, for example, by utilizing a bitmap, which is signaled via higher layer in a UE-specific manner. In one example, a bit value of zero in the bitmap indicates that the PMI and RI reporting is not allowed to correspond to the precoder associated with the bit. The number of bits in the codebook subset restriction bitmap is determined by the number of precoders allowed in both the configured UE-specific transmission mode and the number of antenna ports.

The introduction of multi-user (MU) MIMO transmissions supporting large numbers of users due to transmission points equipped with two-dimensional (2D) antenna arrays with large numbers of elements further motivates the need for efficient PMI selection and feedback techniques. The amount of overhead required grows with both the number of users and the number of antenna elements, compared to previous LTE releases, which only support a maximum of eight transmit antenna elements.

As described earlier, codebook design can take advantage of the spatial structure of the channel resulting from the 2D MIMO antenna array transmissions. Differentiation between the horizontal and vertical dimensions can be used for flexible and efficient codebook design and also has implications on the PMI selection and feedback. Due to the variation in network user geographic distributions, users may experience different angles of elevation and azimuth relative to the transmission point. However the azimuth distribution and the elevation distribution in many networks are likely to be quite different and in fact may be uncorrelated. For example, since transmission points are often mounted several stories above ground, and many users (especially those outdoors) are located on the ground plane, a typical elevation angle range may be within a 45 degree range for most users. However other users (e.g., in high-rise buildings or in hilly terrains) may experience much larger elevation angles with respect to the transmit point.

Figure 7:
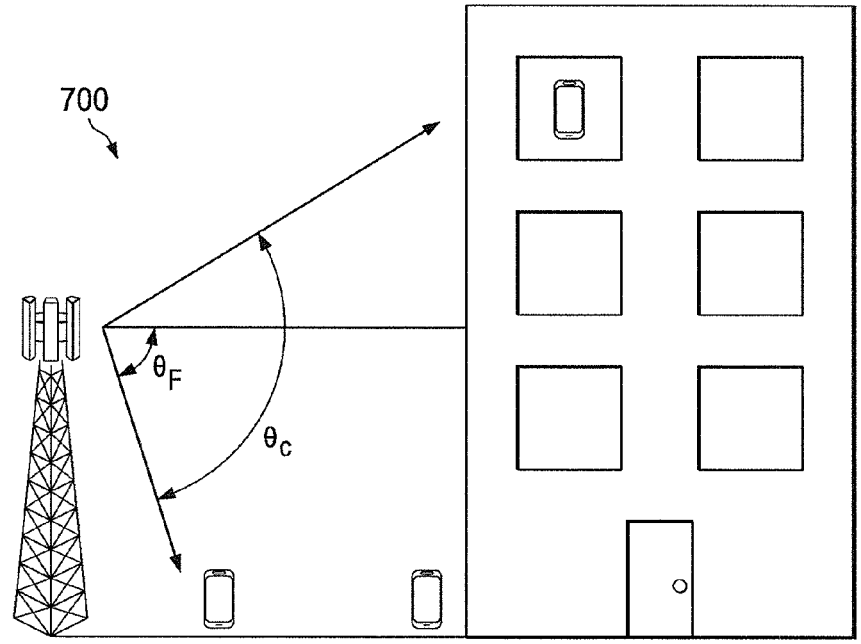
FIG. 7 illustrates an example deployment of a 2D antenna array according to embodiments of this disclosure.

FIG. 7 illustrates an example deployment of a 2D antenna array according to an embodiment of this disclosure. The embodiment of the antenna array 700 illustrated in FIG. 7 is for illustration only. Other embodiments could be used without departing from the scope of this disclosure.

As shown in FIG. 7, angle $\theta_F$, which represents the elevation angle range experienced by the outdoor UEs, is much smaller than $\theta_C$, which represents the elevation angle range experienced by all the UEs. Codebooks may be designed to sample the entire spatial domain (based on a sampled DFT for example). Thus, one method for improving the efficiency of vertical PMI selection and reducing CQI computation complexity is to restrict the UE to searching through the codebook only over those precoders that correspond to relevant spatial domain.

General Subset Restriction:

In an embodiment of the current disclosure, subset restriction of Vertical PMI (V-PMI) is performed by first restricting the total number of unique V-PMI indications M that can be reported to be less than or equal to the total number of possible precoding matrices N.

For example, an 8×8 antenna array at the eNB decomposes the precoder into 8×1 vertical and 8×1 horizontal vectors. If N=16, the UE would need to determine which of the N vertical precoding matrices produces the best CQI (in combination with H-PMI) and then indicate this to the eNB (e.g., using a $\log_2 N$ sized bit field). However, if M=4, the UE only measures CQI on the subset restricted matrices and only reports its selection using a $\log_2 M$ bit field, resulting in an reduction in feedback overhead and CQI computation complexity.

In a first method of general subset restriction, the indication of subset restricted or non-subset restricted PMI selection modes is configurable by the network. In one example, using the array of the prior example, if N=16, the eNB uses a $\log_2 N$ bit field in a higher-layer configuration message to indicate to the UE the desired value of M. If M=N, effectively subset restriction is not configured. In a second example, the eNB can send a UE-specific higher-layer configuration message (e.g., in a RRC layer) for the indication. In a third example, the eNB can send a cell-specific higher-layer configuration message (e.g., in the MIB (master information block) or a SIB (system information block)) for the indication. In a fourth example, when a UE has not received the indication regarding the subset restriction, the UE assumes that M=N.

In a second method of general subset restriction, the codebook subset restriction is dynamically configured with control channel signaling. In one method, for aperiodic CSI requests, an additional bit field is used to indicate the value of M. For example, the bit field may be present or absent depending on the higher layer indication of the configuration of either the subset restricted or the non-subset restricted PMI selection modes.

In a third method of general subset restriction, the number of subset restricted PMI matrices M is configurable by the network. In one example, using the array of the earlier example, if N=16, the eNB uses a $\log_2 N$ bit field in a higher-layer configuration message to indicate to the UE the desired value of M. If M=N, subset restriction is effectively not configured. In a second example, when a UE has received the indication configuring the value of M, the UE feeds back $\log_2 M$-bit PMI according to the configuration.

Figure 8:
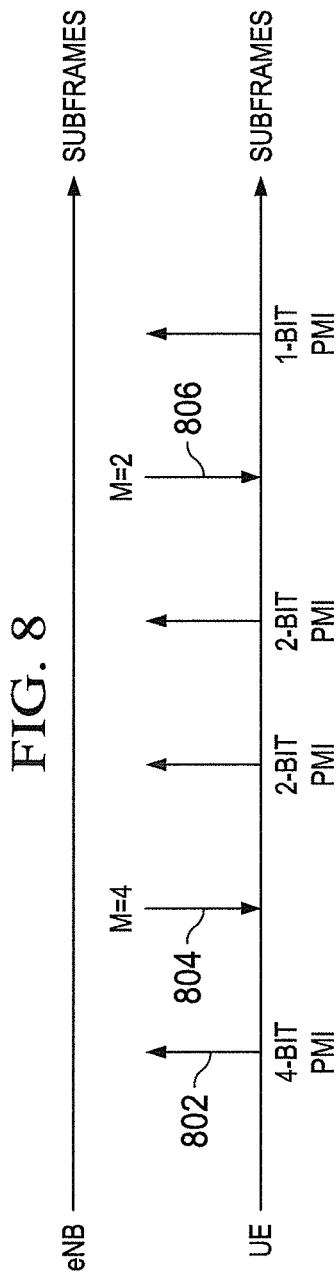
FIG. 8 illustrates a configuration of codebook subset restriction feedback using general subset restriction, according to embodiments of this disclosure.

FIG. 8 illustrates a configuration of codebook subset restriction feedback using general subset restriction, according to embodiments of this disclosure. The embodiment illustrated in FIG. 8 is for illustration only. Other embodiments could be used without departing from the scope of this disclosure.

As illustrated in FIG. 8, before a UE receives the configuration, M=N=16, which corresponds to a 4 bit field (indicated by reference numeral 802). When the UE is configured to use M=4 (indicated by reference numeral 804), the UE feeds back 2-bit PMI. Similarly, when the UE is configured to use M=2 (indicated by reference numeral 806), the UE feeds back 1-bit PMI.

In a third example, M is configurable per CSI process. Here, CSI process 1 for CC-1 can be described as in the following:

```
CSI process 1 for CC-1{
    Channel part: one NZP CSI-RS
    Interference part: one IMR
    PUCCH reporting mode and timing
    PUSCH reporting mode
}
``` where CC represents a component carrier (e.g., a serving cell).

In a fourth method of general subset restriction, the set of V-PMI matrices corresponding to the M subset restricted matrices are configured by the eNB. For example, using the array of the earlier example, the eNB uses values of the PMI mapping field given in a higher-layer configuration message as shown in Table 1 below to indicate to the UE the desired M=4 precoding matrices out of the total N=16.

TABLE 1

Mapping of subset restriction PMI indices

| Value of PMI indication field | PMI Indices |
|---|---|
| '00' | 1, 5, 9, 13 |
| '01' | 2, 6, 10, 14 |
| '10' | 3, 7, 11, 15 |
| '11' | 4, 8, 12, 16 |

The PMI indication field as described in the above example may be indicated with control signaling, e.g. as part of an aperiodic CSI request.

In a fifth method of general subset restriction, the set of V-PMI matrices corresponding to the M subset restricted matrices are pre-determined and fixed at the UE.

Feedback Type Based Subset Restriction:

Depending on the deployment scenario, user mobility, and the structure of the antenna array, the wireless channel between the transmission point and the UE may experience short-term and long-term fluctuations. As a result, there is a trade-off between frequent reports of the CSI/PMI/CQI in order to track and respond to channel conditions and the resulting transmission overhead.

In an embodiment of the current disclosure, subset restriction is configured based on the type of user feedback. The periodicity of the feedback is one parameter than can be adapted by the network in response. Since it provides a method for reducing overhead and complexity, PMI subset restriction is a desirable characteristic for periodic feedback reports that are configured to regularly track the channel. In contrast, aperiodic feedback may be configured much less frequently and therefore subset restriction may not be desired, since overhead reduction is not as important and the aperiodic reports can be utilized to sample the entire precoding space to ensure that the subset selected for the periodic reports still results in acceptable performance. If other precoding vectors outside of the subset are found to provide better CQI, then the network may update the subset restriction set for the UE. With this observation, the following methods are described.

In a first method of feedback type subset restriction, subset restriction is applied only in the case of periodic feedback; non-subset restriction is employed for aperiodic feedback. For example, the behavior is signaled to a UE through a control or higher-layer CSI/PMI reporting field, for example, as shown in Table 2 below.

TABLE 2

CSI/PMI configuration signaling

| Value of CSI/PMI report field | Description |
|---|---|
| '0' | Periodic CSI report is configured/No subset restriction is configured |
| '1' | Periodic CSI report is configured/Subset restriction with subset size M is configured |

In a second method of feedback type subset restriction, subset restriction is applied only in the case of aperiodic feedback, while non-subset restriction is employed for periodic feedback.

In a third method of feedback type subset restriction, subset restriction is configured by a single set of parameters for both periodic and aperiodic feedback. One benefit of a single set of parameters may be to reduce the UE implementation complexity.

In a fourth method of feedback type subset restriction, subset restriction is configured independently for both periodic and aperiodic feedback.

Sampling Based Subset Restriction:

One method for determining the subset restricted precoding matrices is to sample from the larger codebook using a predetermined method. A DFT-based codebook, for example, may be used for sampling. In the Release-10 specification of LTE, a double codebook structure is used for the 8-Tx antenna configuration. A DFT codebook is used for the four-element ULA. Sampling of a larger DFT codebook may be used to reduce codebook size in some embodiments. More specifically, the sampling may be based on the text and tables below from REF3.

Text from REF3:

For 8 antenna ports, each PMI value corresponds to a pair of codebook indices given in Table 7.2.4-1, 7.2.4-2, 7.2.4-3, 7.2.4-4, 7.2.4-5, 7.2.4-6, 7.2.4-7, or 7.2.4-8, where the quantities $\phi_n$ and $v_m$ are given by $$\phi_n = e^{j\pi n/2}$$

$$v_m = [1 \; e^{j2\pi m/32} \; e^{j4\pi m/32} \; e^{j6\pi m/32}]^T \quad (3)$$

as follows: For 8 antenna ports $\{15,16,17,18,19,20,21,22\}$, a first PMI value of $n_1 \in \{0,1,\ldots,f(v)-1\}$ and a second PMI value of $n_2 \in \{0,1,\ldots,g(v)-1\}$ corresponds to the codebook indices $n_1$ and $n_2$ given in Table 7.2.4-j with v equal to the associated RI value and where j=v, $f(v)=\{16,16,4,4,4,4,4,1\}$ and $g(v)=\{16,16,16,8,1,1,1,1\}$.

In some cases codebook subsampling is supported. The sub-sampled codebook for PUCCH mode 1-1 submode 2 is defined in Table 7.2.2-1D for first and second precoding matrix indicator $i_1$ and $i_2$. Joint encoding of rank and first precoding matrix indicator $i_1$ for PUCCH mode 1-1 submode 1 is defined in Table 7.2.2-1E. The sub-sampled codebook for PUCCH mode 2-1 is defined in Table 7.2.2-1F for the second precoding matrix indicator $i_2$.

TABLE 7.2.4-1

Codebook for 1-layer CSI reporting using antenna ports 15 to 22.

| $i_1$ | $i_2$ | | | | | | | |
|---|---|---|---|---|---|---|---|---|
| | 0 | 1 | 2 | 3 | 4 | 5 | 6 | 7 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |

| $i_1$ | $i_2$ | | | | | | | |
|---|---|---|---|---|---|---|---|---|
| | 8 | 9 | 10 | 11 | 12 | 13 | 14 | 15 |
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ | $W_{2i_1+3,3}^{(1)}$ | where $W_{m,n}^{(1)} = \frac{1}{\sqrt{8}} \begin{bmatrix} v_m \\ \varphi_n v_m \end{bmatrix}$

TABLE 7.2.2-1D

PUCCH mode 1-1 submode 2 codebook subsampling.

| | Relationship between the first PMI value and codebook index $i_1$ | | Relationship between the second PMI value and codebook index $i_2$ | | |
|---|---|---|---|---|---|
| RI | Value of the first PMI $I_{PMI1}$ | Codebook index $i_1$ | Value of the second PMI $I_{PMI2}$ | Codebook index $i_2$ | total #bits |
| 1 | 0-7 | $2I_{PMI1}$ | 0-1 | $2I_{PMI2}$ | 4 |
| 2 | 0-7 | $2I_{PMI1}$ | 0-1 | $I_{PMI2}$ | 4 |
| 3 | 0-1 | $2I_{PMI1}$ | 0-7 | $4\lfloor I_{PMI2}/4 \rfloor + I_{PMI2}$ | 4 |
| 4 | 0-1 | $2I_{PMI1}$ | 0-7 | $I_{PMI2}$ | 4 |
| 5 | 0-3 | $I_{PMI1}$ | 0 | 0 | 2 |
| 6 | 0-3 | $I_{PMI1}$ | 0 | 0 | 2 |
| 7 | 0-3 | $I_{PMI1}$ | 0 | 0 | 2 |
| 8 | 0 | 0 | 0 | 0 | 0 |

(End text from REF3.)

Sampling in this manner can be directly related to the spatial characteristics of the channel environment. A coarse sampling of the codebook may give a broad representation of the vertical spatial dimension. Fine sampling selects possible precoding matrices from a spatially localized subset.

Figure 9:
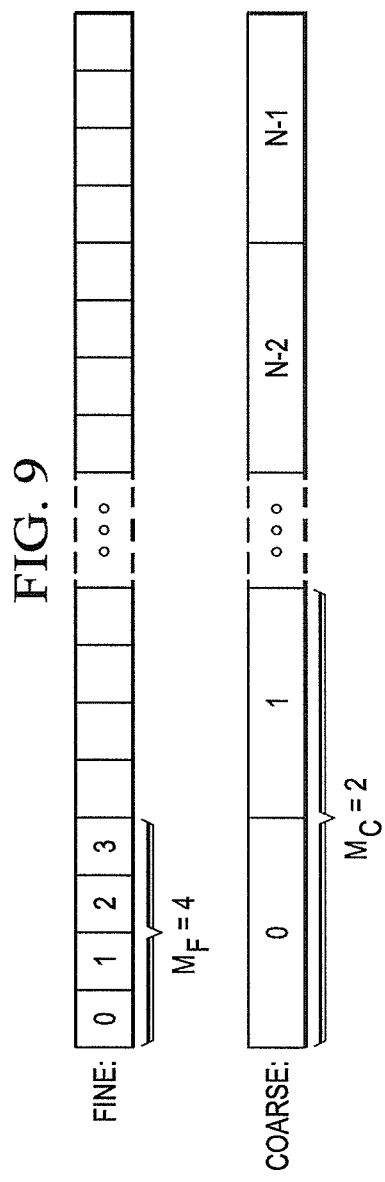
FIG. 9 illustrates fine and coarse PMI (precoding matrix indicator) subsampling of a codebook for use in subset restriction, according to embodiments of this disclosure.

FIG. 9 illustrates fine and coarse PMI subsampling of a codebook for use in subset restriction, according to an embodiment of this disclosure. The embodiment illustrated in FIG. 9 is for illustration only. Other embodiments could be used without departing from the scope of this disclosure. The PMI subsampling shown in FIG. 9 may be used in conjunction with the network environment of FIG. 7.

As shown in FIG. 9, in the case of coarse sampling, each precoder spans a large vertical range (e.g., $\theta_C$ in FIG. 7). A size-64 DFT codebook is sampled by a factor of $K_C=8$ (PMI index i corresponds to DFT codebook index $I=K_C$ i). This results in a subsampled codebook of size N=8, and each resulting codeword represents a 180°/N=22.5° range in the vertical direction. Subset restriction can be further applied with $M_C=2$ (corresponding to a 45° vertical range) and the UE selects either PMI index 0 or 1 based on the resulting CQI.

In the case of fine sampling, the subsampling factor is $K_F=2$ (PMI index i corresponds to DFT index $I=K_F$ i). Thus, the subsampled codebook is of size N=32, and each resulting codeword represents a 180°/N=5.625° range in the vertical direction. With fine sampling of $M_F=4$, the four possible precoders represent a 22.5° vertical range.

It is noted that an m-th 8-antenna-port precoder out of a DFT codebook of size N is represented by:

$$v_m = [1\ e^{j\theta_C}\ e^{j2\theta_C}\ e^{j3\theta_C}\ e^{j4\theta_C}\ e^{j5\theta_C}\ e^{j6\theta_C}\ e^{j7\theta_C}]^T, \quad (4)$$

and corresponds to an angle of $\theta_C=2\pi m/N$.

In a first method of sampling based subset restriction, coarse and fine sampling factors ($K_F$ and $K_C$) and subset restriction search spaces ($M_F$ and $M_C$) can be separately configured and adapted by the network.

In a second method of sampling based subset restriction, coarse and fine sampling factors ($K_F$ and $K_C$) and subset restriction search spaces ($M_F$ and $M_C$) can be jointly configured and adapted by the network. For example, based on the sampling shown in FIG. 9, a sampling/subset restriction bit field may be indicated to the UE via a higher layer signaling message, as shown in Table 3 below.

TABLE 3

Sampling/subset restriction bit field

| Sampling/Subset Restriction | Coarse | Fine |
|---|---|---|
| '00' | $K_C = 8, M_C = 2$ | $K_F = 2, M_F = 2$ |
| '01' | $K_C = 8, M_C = 2$ | $K_F = 2, M_F = 4$ |
| '10' | $K_C = 8, M_C = 4$ | $K_F = 2, M_F = 4$ |
| '11' | $K_C = 8, M_C = 4$ | $K_F = 2, M_F = 8$ |

In a third method of sampling based subset restriction, coarse sampling parameters ($K_C$, $M_C$) are preconfigured and not adapted by the network. Likewise, in a fourth method of sampling based subset restriction, fine sampling parameters ($K_F$, $M_F$) are preconfigured and not adapted by the network.

In a fifth method of sampling based subset restriction, the subset restriction search space for fine sampling is determined based upon the coarse sampling subset restriction search space.

In a sixth method of sampling based subset restriction, when the eNB configures the fine sampling to a UE, the eNB configures a fine codebook subset restriction search space, e.g., in terms of a corresponding coarse PMI (or $PMI_C$) index. For example, based on the sampling shown in FIG. 9, coarse sampling is first applied with $K_C=8$, $M_C=2$. If PMI index 0 is determined to provide the highest CQI, PMI index 0 is selected and reported to eNB. Subsequently, if fine sampling is configured ($K_F=2$, $M_F=4$), the configured fine-sampled subset corresponds to the same region of the codebook (or same spatial interpretation). For example, if coarse codeword 0 corresponds to a 0°-22.5° vertical range, fine codewords 0-3 correspond to ranges of 0°-5.625°, 5.625°-11.25°, 11.25°-16.875°, and 16.875°-22.5° respectively, as shown in Table 4 below.

TABLE 4

Coarse/fine precoder index and vertical angle range mapping

| Codebook type | Coarse | Fine |
| --- | --- | --- |
| PMI number (Angle range, precoder vector) | $PMI_C = 0$ (0°-22.5°) | $PMI_F = 0$ (0°-5.625°) |
|  |  | $PMI_F = 1$ (5.625°-11.25°) |
|  |  | $PMI_F = 2$ (11.25°-16.875°) |
|  |  | $PMI_F = 3$ (16.875°-22.5°) |
|  | $PMI_C = 1$ (22.5°-45°) | $PMI_F = 4$ (22.5°-...) |
|  |  | $PMI_F = 5$ (...) |
|  |  | $PMI_F = 6$ (...) |
|  |  | $PMI_F = 7$ (...-45°) |
| ... | ... | ... |

In a seventh method of sampling based subset restriction, subset restriction is only applied for fine sampling (i.e., a UE should always assume $K_C=M_C$). For example, based on the sampling shown in FIG. 9, coarse sampling is first applied with $K_C=M_C=8$. If PMI index 0 is determined to provide the highest CQI, PMI index 0 is selected and reported to eNB. Subsequently, if fine sampling is configured ($K_F=2$, $M_F=4$), the configured fine-sampled subset corresponds to the same region of the codebook (or same spatial interpretation).

In an eighth method of sampling based subset restriction, subset restriction is only applied for coarse sampling.

Sliding Window Based Subset Restriction:

FIGS. 10 and 11 illustrate examples of sliding window based subset restriction, according to embodiments of this disclosure. The embodiments illustrated in FIGS. 10 and 11 are for illustration only. Other embodiments could be used without departing from the scope of this disclosure.

In accordance with FIGS. 10 and 11, only a single large codebook is used. Corresponding values K and M are defined. Additionally, another parameter C is defined. In a first method of sliding window based subset restriction, C represents the beginning of the subset codebook, as shown in FIG. 10. In a second method, C represents the center of the subset codebook. For example, a codebook may be configured with N=64 elements. As shown in FIG. 10, M=16 and C=17. Thus, the corresponding codebook subset is {17, 18, 19, . . . 32}.

The parameters M, N, and C may be determined according to a number of methods. In a first method, M and N are fixed and only C is configurable. C may be configured by higher layer signaling. In a second method, N is fixed and M and C are configurable. M and C may be configured by higher layer signaling. In a third method, one or more of M and C are indicated by control signaling. In a fourth method, the determination to use a sampled subset codebook or a sliding window subset codebook may be configurable by the network.

As shown in FIG. 11, both codebook sampling and widowing may be supported simultaneously using four parameters, N, M, C and a sampling factor K, which applies over the selected subset. In FIG. 11, N=64, M=8, C=17, and K=2. The sampling factor K=2 means that every second element in the window is sampled, as indicated by the dashed lines in FIG. 11.

Configuration of H and V-PMI:

In one embodiment of this disclosure, multiple methods are described for configuring codebook subsets for V-PMI. These methods can be used to configure codebook subsets for both H-PMI and V-PMI.

In a first method, one or more parameters $N_H$, $M_H$, $K_H$, $C_H$, $N_V$, $M_V$, $K_V$, $C_V$ are configured by higher layer signaling. In a second method, one or more parameters $N_H$, $M_H$, $K_H$, $C_H$, $N_V$, $M_V$, $K_V$, $C_V$ are configured by control signaling. In a third method, one or more parameters $N_H$, $M_H$, $K_H$, $C_H$, $N_V$, $M_V$, $K_V$, $C_V$ are configured by higher layer signaling and one or more remaining parameters are configured by control signaling. In a fourth method, multiple predefined sets of these parameters can be jointly designed to target a fixed total codebook size.

Bitmap Signaling:

Codebook subset restriction can be signaled to a UE by using a bitmap in a UE-specific manner. A bit value of zero in the bitmap indicates that the PMI reporting is not allowed to correspond to the precoder associated with the bit. The number of bits in the codebook subset restriction bitmap N is determined by the number of precoders allowed. The bitmap A forms the bit sequence $a_{N-1}, \ldots, a_3, a_2, a_2, a_1, a_0$, where $a_0$ is the least significant bit (LSB) and $a_{N-1}$ is the most significant bit (MSB).

In an embodiment of this disclosure, subset restriction of Vertical PMI is employed by defining an entire bitmap A. In a first example embodiment (8 antenna ports, i1-first mapping), interpretation of bit values in the bitmap is formulated as follows: bit $a_{g(v)+i_2 f(v)+i_1}$ is associated with the precoder for v layers and with codebook index pair ($i_1$, $i_2$), where function g(v) provides the number of all the precoders for rank less than v. Function $f(v)$ is the size of the codebook.

In a second example embodiment (8 antenna ports, i2-first mapping), interpretation of bit values in the bitmap is formulated as follows: bit $a_{g(v)+i_1 \theta(v)+i_2}$ is associated with the precoder for v layers and with codebook index pair ($i_1$, $i_2$), where function g(v) provides the number of all the precoders for rank less than v. Function $f(v)$ is the size of the codebook.

The number of bits in codebook subset restriction bitmap A may be configured based on applicable transmission modes and/or the rank of the transmission.

Bitmap Signaling Error Handling:

If the number of 1's indicated by the transmitted V-PMI bitmap is not equal to the number of selected PMI subset restricted matrices M, then there is ambiguity at the UE about which precoding matrices to report. A number of methods may be used to handle the ambiguity or error.

In a first method of bitmap signaling error handling, if the number of 1's indicated by the transmitted V-PMI bitmap is greater than M, the UE selects the first M indicated precoding matrices starting from the least significant bit. In a second method, if the number of 1's indicated by the transmitted V-PMI bitmap is greater than M, the UE selects the first M indicated precoding matrices starting from the most significant bit.

In a third method of bitmap signaling error handling, if the number of 1's indicated by the transmitted V-PMI bitmap is less than M, the UE selects from only the precoding matrices indicated in the bitmap. In a fourth method, if the number of 1's indicated by the transmitted V-PMI bitmap, m, is not equal to M, the UE uses one of the prior embodiments and also signals the difference M-m via higher-layer signaling. In a fifth method, the UE does not expect the number of 1's indicated by the transmitted V-PMI bitmap, m, to not be equal to M.

Separate Bitmaps for V and H:

In an embodiment of this disclosure, separate bitmaps are defined for subset restriction of Vertical and Horizontal precoders V and H individually. For example, two bitmaps $A_V$ and $A_H$ defined for V and H, respectively, form the bit sequences as follows:

$$A_V = \{a_{N_V-1}^V, \ldots, a_3^V, a_2^V, a_1^V, a_0^V\} \quad (5)$$

$$A_H = \{a_{N_H-1}^H, \ldots, a_3^H, a_2^H, a_1^H, a_0^H\} \quad (6)$$

where $N_V$ and $N_H$ denote the number of bits in bitmaps $A_V$ and $A_H$, respectively.

The bitmaps may be implemented using a number of methods. In a first method, the bitmaps $A_V$ and $A_H$, corresponding to V and H are fed back to the transmitter separately. In a second method, the bitmaps $A_V$ and $A_H$ are concatenated: P={V,H}. The resulting bitmap of size $N_{VH}=N_V+N_H$ is given by:

$$A_{VH} = \{a_{N_{VH}-1}, \ldots, a'_1, a_0\} = \{A_V, A_H\} = \{a_{N_V-1}^V, \ldots, a_1^V, a_0^V, a_{N_H-1}^H, \ldots, a_1^H, a_0^H\} \quad (7)$$

In a third method, the concatenation order is reversed: P={H,V}. The resulting bitmap of size AHV=AH+AV is given by:

$$A_{HV} = \{a_{HV-1}, \ldots, a_1, a_0\} = \{A_H, A_V\} = \{a_{N_H-1}^H, \ldots, a_1^H, a_0^H, a_{N_V-1}^V, \ldots, a_1^V, a_0^V\} \quad (8)$$

Independence of V and H:

In an embodiment of this disclosure, subset restriction of Vertical and Horizontal PMI is designed, selected, or configured independently. For example, an 8×8 antenna array at the eNB decomposes the precoder into 8×1 vertical and 8×1 horizontal vectors. If MH=4 and MV=2, the UE determines which of the MV vertical precoding matrices produces the best CQI. The selection of the MV vertical precoding matrices is performed and signaled using any of the prior embodiments and is independent of the selection of the MH matrices.

Joint V/H Selection:

In an embodiment of this disclosure, subset restriction of Vertical and Horizontal PMI is designed, selected, or configured jointly. For example, using the embodiment of the previous example, the selection of the MV vertical precoding matrices and MH horizontal matrices is performed and signaled using any of the prior embodiments. Table 5 below provides an illustrative example of higher layer signaling to indicated the joint selection in the case of MH=4 and MV=2.

TABLE 5

| Joint H-PMI/V-PMI indication field | H-PMI indices | V-PMI indices |
|---|---|---|
| 0 | 1, 2, 3, 4 | 1, 2 |
| 1 | 5, 6, 7, 8 | 3, 4 |

In a first method of joint V/H selection, selection and indication of H-PMI subset restriction indices is used to determine the set of V-PMI indices. For example, using the embodiment of the previous example, the selection of the MV vertical precoding matrices is performed and signaled using any of the prior embodiments and is conditioned on the selection of the MH matrices. Table 6 below provides an illustrative example in the case of MH=2 and MV=1.

TABLE 6

| H-PMI/V-PMI mapping | |
|---|---|
| H-PMI indices | V-PMI indices |
| 1, 2 | 1 |
| 1, 3 | 1 |
| 1.4 | 2 |
| 2, 3 | 2 |
| 2, 4 | 3 |
| 3, 4 | 4 |

In a second method of joint V/H selection, selection and indication of V-PMI subset restriction indices is used to determine the set of H-PMI indices. For example, using the embodiment of the previous example, the selection of the MH horizontal precoding matrices is performed and signaled using any of the prior embodiments and is conditioned on the selection of the MV matrices. Table 7 below provides an illustrative example in the case of MV=4 and MH=2.

TABLE 7

| H-PMI/V-PMI mapping | |
|---|---|
| V-PMI indices | H-PMI indices |
| 1, 2, 3, 4 | 1, 2 |
| 1, 2, 3, 5 | 1, 3 |
| 1, 2, 3, 6 | 1.4 |
| 2, 3, 4, 5 | 2, 3 |
| 2, 4, 6, 8 | 2, 4 |
| 1, 3, 5, 7 | 3, 4 |

PMI Subset Restriction Indication via Antenna Configuration Signaling:

In an embodiment of this disclosure, the indicated antenna configuration is used to convey the set of available precoding matrices. The antenna configuration may include a variety of relevant parameters including the size of the transmit antenna array, antenna orientation, and their relative location (e.g., distributed, co-located, narrow vs. wide spacing).

In one method, the precoders are known or determined at the receiver and their selection is implicit based upon the conveyed antenna configuration. The antenna configuration may be limited to the numbers of the vertical CSI-RS ports and the horizontal CSI-RS ports. For example, the eNB signals an 8×4 antenna configuration to the UE with 0.5λ antenna spacing (e.g., eNB configures 8-port horizontal CSI-RS and 4-port vertical CSI-RS). Based on this information, the UE knows to select precoders 1, 3, 5, and 7 out of the available N=16 precoders if M=4. One example of higher-layer mapping between antenna configuration and PMI subsets is given in Table 8 below.

TABLE 8

Antenna Configuration/V-PMI mapping

| Antenna Configuration Field | Antenna configuration | Supported PMI indices |
|---|---|---|
| '00' | 8 × 4 Antenna Array; .5λ element spacing | 1, 3 5, 7 |
| '01' | 8 × 4 Antenna Array; 2λ element spacing | 2, 4 6, 8 |
| '10' | 8 × 8 Antenna Array; .5λ element spacing | 1, 3 5, 7, 9, 11, 13, 15 |
| '11' | 8 × 8 Antenna Array; 2λ element spacing | 2, 4 6, 8, 10, 12, 14, 16 |

In a first method of PMI subset restriction indication via antenna configuration signaling, the codebook subset restriction parameters are known or determined at the receiver and are implicitly determined based upon at least one of the conveyed antenna configuration parameters (e.g., the number of configured antenna ports). In a second method, the precoders are known or determined at the receiver and their selection is explicit based upon the conveyed antenna configuration and signaling indicating the corresponding precoder(s). For example, the eNB signals an 8×4 antenna configuration to the UE with antenna spacing and initial codebook index of 1 with spacing of 2 between precoders. Based on this information, the UE knows to select from precoders 1, 3, 5, and 7 out of the available N=16 precoders if M=4.

In another method, the current UE state or configuration is jointly considered with the eNB and transmitter antenna configuration in codebook selection. For example, consideration of the current UE state or configuration may include differentiation between high-speed and low-speed mobiles, UE antenna orientation, and relative locations of the UE and the eNB.

Codebook Selection via Antenna Configuration Signaling:

In an embodiment of this disclosure, the indicated antenna configuration is used to convey from a set of possible codebooks the desired codebook from which the set of available precoding matrices is obtained. The antenna configuration may include a number of relevant parameters, including the size of the transmit antenna array, antenna orientation, and their relative location (e.g., distributed/co-located, narrow vs. wide spacing).

In a first method of codebook selection via antenna configuration signaling, the codebooks are known or determined at the receiver and their selection is implicit based upon the conveyed antenna configuration. For example, the eNB signals an 8×8 antenna configuration to the UE with 0.5λ antenna spacing. Based on this information, the UE knows to select a size 64 DFT codebook, and may further perform subset restrictions on the DFT codebook by selecting only a subset of precoding vectors from the codebook. The higher-layer mapping between antenna configuration and PMI subsets is given in Table 9 below.

TABLE 9

Antenna Configuration/Codebook mapping

| Antenna Configuration Field | Antenna configuration | Codebook |
|---|---|---|
| '00' | 8 × 4 Antenna Array; .5λ element spacing | Size 32-DFT codebook |
| '01' | 8 × 4 Antenna Array; 2λ element spacing | Size 32-Non DFT codebook |
| '10' | 8 × 8 Antenna Array; .5λ element spacing | Size 64-DFT codebook |
| '11' | 8 × 8 Antenna Array; 2λ element spacing | Size 64-Non DFT codebook |

In a second method, the codebooks are known or determined at the receiver and their selection is implicitly determined based upon at least one of the conveyed antenna configuration parameters (e.g., number of configured antenna ports). In a third method, the codebooks are known or determined at the receiver and their selection is explicit based upon the conveyed antenna configuration and signaling indicating the corresponding codebook(s). For example, the eNB signals 8×4 antenna configuration to the UE with 0.5λ antenna spacing and codebook index of 1. Based on this information, the UE knows to select a size 32-DFT codebook.

In a fourth method, the current UE state or configuration is jointly considered with eNB and transmitter antenna configuration in codebook selection. For example, consideration of the current UE state or configuration may include differentiation between high-speed and low-speed mobiles, UE antenna orientation, and relative locations of the UE and the eNB.

Hierarchical Codebook Structure:

In some networks, it may be desirable to improve performance by introducing an "on-demand" or iterative PMI feedback approach to adapt to changing network or channel conditions. The network may configure a baseline codebook subset restriction configuration, and then the network or UE may determine that additional codebook subset restriction parameters should be configured to provide a second report type conditioned on the first set of parameters.

In one embodiment of the current disclosure, a first set of one or more of the subset restriction parameters (e.g., parameters N, MC, KC, C, or, more generally, bit-fields or bitmaps described before) can be associated with one type of feedback report while a second set of the remaining parameters is associated with a second type of feedback report and may be conditioned on the first feedback report type.

In a first method, a PMI (V or H) may be fed back using aperiodic feedback conditioned on periodic reports. For example, a coarse sampled DFT codebook may be used for periodic reporting. An aperiodic report request may send the finely sampled codebook conditioned on, e.g., the periodic report as given in FIG. 8. As a second, more general example, a first set of one or more of the parameters (e.g., parameters N, MC, KC, C, or, more generally, bit-fields or bitmaps described before) can be associated with the periodic report while a second set of the remaining parameters (e.g., parameters MF, KF) is associated with the aperiodic report.

In a second method, a PMI (V or H) may be fed back using a report with different report timing. For example, if periodic reporting is configured, a slower report may be a type X report and a faster report may be a type Y report, each with independent timing parameters. As another example, a coarse sampled DFT codebook may be used for slower periodic reporting. The faster report may send the finely sampled codebook conditioned on the slower periodic report. As yet another (more general) example, a first set of one or more of the parameters (e.g., parameters N, MC, KC, C, or, more generally, bit-fields or bitmaps described before) can be associated with the type X report, while a second set of the remaining parameters (e.g., parameters MF, KF) is associated with the type Y report.

In a third method, a PMI (V or H) may be fed back using a wideband and a narrowband (subband) report. For example, a coarse sampled DFT codebook may be used for wideband reporting. The subband report may send the finely sampled codebook conditioned on the wideband report. As a second, more general example, a first set of one or more of the parameters (e.g., parameters N, MC, KC, C, or, more generally, bit-fields or bitmaps described before) can be associated with the wideband report while a second set of the remaining parameters (e.g., parameters MF, KF) is associated with the subband report.

In a fourth method, where a hierarchical codebook may be used, the codebook subset restriction may set up the first set and the second set of parameters by higher layer signaling. In a fifth method, where a hierarchical codebook may be used, the codebook subset restriction may set up either the first set or the second set of parameters by higher layer signaling.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a user equipment (UE) in a wireless network having two-dimensional antenna systems, a method of codebook sampling, the method comprising:
   receiving from an eNodeB (eNB) an indication of one or more restricted subsets M of vertical precoding matrices or non-subset restricted precoding matrix indicator (PMI) selection modes, wherein M is less than a total number of vertical precoding matrices N in a codebook and wherein the indication of the restricted subset or the non-subset restricted PMI selection modes is configurable by the network and received form the eNB through a higher layer signalling in conjunction with one or more changed feedback configurations, the codebook comprising a plurality of vertical precoding matrices and horizontal precoding matrices; and
   feeding back vertical precoding matrix indicators (V-PMI) to the eNB based on the restricted subset of vertical precoding matrices,
   wherein separate bitmaps are defined for subset restriction of Vertical and Horizontal precoders V and H individually, and
   wherein at least two bitmaps, $A_V$ and $A_H$ are with lengths $N_V$ and $N_H$, wherein the lengths are configured by higher layers.

2. The method of claim 1, wherein the indication of the one or more restricted subsets M is received when the feedback to the eNB is periodic, the method further comprising receiving an indication of an unrestricted subset of vertical precoding matrices when the feedback to the eNB is aperiodic.

3. The method of claim 1, wherein the one or more subsets M are restricted based on at least one of a coarse sampling factor $K_C$ and a fine sampling factor $K_F$, each sampling factor configured by the network and associated with a range of transmission angles in a vertical direction.

4. The method of claim 3, wherein a subset restriction search space for fine sampling is determined based on a corresponding subset restriction search space for coarse sampling.

5. The method of claim 1, wherein the one or more subsets M are based on a window of vertical precoding matrices in the codebook, the window having a predetermined starting point C and a predetermined length M.

6. The method of claim 5, wherein the one or more subsets M comprises every K-th element in the window of vertical precoding matrices, where K is a predetermined integer.

7. The method of claim 1, further comprising:
   determining a restricted subset of horizontal precoding matrices, wherein the subset restriction of vertical precoding matrices and horizontal precoding matrices is configured jointly based on a value of a single indicator for both vertical precoding matrices and horizontal precoding matrices.

8. The method of claim 1, wherein a codebook subset restriction is received using a bitmap in a UE-specific manner.

9. The method of claim 8, wherein separate bitmaps are defined for subset restriction of Vertical and Horizontal precoders V and H individually.

10. The method of claim 8 wherein at least two bitmaps, $A_V$ and $A_H$ are respectively defined according to a first equation:

$$A_V = \{a_{N_V-1}^V, \ldots, a_3^V, a_2^V, a_1^V, a_0^V\}; \text{ and}$$

a second equation:

$$A_H = \{a_{N_H-1}^H, \ldots, a_3^H, a_2^H, a_1^H, a_0^H\}.$$

11. The method of claim 1, wherein the indication is configured to at least one of:
   indicate a number of antenna ports per polarization in dimension x as used for transmission of CSI reference signals; or
   indicate a spatial over-sampling rate in dimension x as used for transmission of CSI reference signals.

12. A user equipment (UE) configured for communication with an eNodeB (eNB) in a wireless network having two-dimensional antenna systems, the UE comprising:
   at least one antenna;
   and a processor coupled to the at least one antenna, the processor configured to:

receive from the eNB an indication of one or more restricted subsets M of vertical precoding matrices or non-subset restricted precoding matrix indicator (PMI) selection modes, wherein M is less than a total number of vertical precoding matrices N in a codebook and wherein the indication of the restricted subset or the non-subset restricted PMI selection modes is configurable by the network and received form the eNB through a higher layer signalling in conjunction with one or more changed feedback configurations, the codebook comprising a plurality of vertical precoding matrices and horizontal precoding matrices; and feed back, via the at least one antenna, vertical precoding matrix indicators (V-PMI) to the eNB based on the restricted subset of vertical precoding matrices, wherein separate bitmaps are defined for subset restriction of Vertical and Horizontal precoders V and H individually, and wherein at least two bitmaps, $A_V$ and $A_H$ are with lengths $N_V$ and $N_H$ wherein the lengths are configured by higher layers.

13. The UE of claim 12, wherein the indication of the one or more restricted subsets M is received when the feedback to the eNB is periodic, the processor further configured to receive an indication of an unrestricted subset of vertical precoding matrices when the feedback to the eNB is aperiodic.

14. The UE of claim 12, wherein the one or more subsets M are restricted based on at least one of a coarse sampling factor $K_C$ and a fine sampling factor $K_F$, each sampling factor configured by the network and associated with a range of transmission angles in a vertical direction.

15. The UE of claim 14, wherein a subset restriction search space for fine sampling is determined based on a corresponding subset restriction search space for coarse sampling.

16. The UE of claim 12, wherein the one or more subsets M are based on a window of vertical precoding matrices in the codebook, the window having a predetermined starting point C and a predetermined length M.

17. The UE of claim 16, wherein the one or more subsets M comprises every K-th element in the window of vertical precoding matrices, where K is a predetermined integer.

18. The UE of claim 12, the processor further configured to:
determine a restricted subset of horizontal precoding matrices, wherein the subset restriction of vertical precoding matrices and horizontal precoding matrices is configured jointly based on a value of a single indicator for both vertical precoding matrices and horizontal precoding matrices.

19. An eNodeB (eNB) configured for communication with a plurality of user equipments (UEs) in a wireless network having two-dimensional antenna systems, the eNB comprising:

at least one antenna;

and a processor coupled to the at least one antenna, the processor configured to:
transmit to a UE an indication of one or more restricted subsets M of vertical precoding matrices or non-subset restricted precoding matrix indicator (PMI) selection modes, wherein M is less than a total number of vertical precoding matrices N in a codebook and wherein the indication of the restricted subset or the non-subset restricted PMI selection modes is configurable by the network and received form the eNB through a higher layer signalling in conjunction with one or more changed feedback configurations, the codebook comprising a plurality of vertical precoding matrices and horizontal precoding matrices; and receive feedback from the UE, the feedback comprising a plurality of vertical precoding matrix indicators (V-PMI) based on the restricted subset of vertical precoding matrices, wherein separate bitmaps are defined for subset restriction of Vertical and Horizontal precoders V and H individually, and wherein at least two bitmaps, $A_V$ and $A_H$ are with lengths $N_V$ and $N_H$ wherein the lengths are configured by higher layers.

20. The eNB of claim 19, wherein the indication of the one or more restricted subsets M is transmitted when the feedback from the UE is periodic, the processor further configured to transmit an indication of an unrestricted subset of vertical precoding matrices when the feedback from the UE is aperiodic.

21. The eNB of claim 19, wherein the one or more subsets M are restricted based on at least one of a coarse sampling factor $K_C$ and a fine sampling factor $K_F$, each sampling factor configured by the network and associated with a range of transmission angles in a vertical direction.

22. The eNB of claim 21, wherein a subset restriction search space for fine sampling is determined based on a corresponding subset restriction search space for coarse sampling.

23. The eNB of claim 19, wherein the one or more subsets M are based on a window of vertical precoding matrices in the codebook, the window having a predetermined starting point C and a predetermined length M.

24. The eNB of claim 23, wherein the one or more subsets M comprises every K-th element in the window of vertical precoding matrices, where K is a predetermined integer.

25. The eNB of claim 19, the processor further configured to:
transmit to a UE an indication of a restricted subset of horizontal precoding matrices, wherein the subset restriction of vertical precoding matrices and horizontal precoding matrices is configured jointly based on a value of a single indicator for both vertical precoding matrices and horizontal precoding matrices.

* * * * *